(12) United States Patent
Rodriguez Martinez

(10) Patent No.: US 11,767,827 B1
(45) Date of Patent: Sep. 26, 2023

(54) THERMAL-CYCLE POWERED WATER PUMP

(71) Applicant: Reynaldo S. Rodriguez Martinez, Newport News, VA (US)

(72) Inventor: Reynaldo S. Rodriguez Martinez, Newport News, VA (US)

( * ) Notice: Subject to any disclaimer, the term of this patent is extended or adjusted under 35 U.S.C. 154(b) by 0 days.

(21) Appl. No.: 17/933,948

(22) Filed: Sep. 21, 2022

(51) Int. Cl.
*F03G 6/00* (2006.01)
*F04B 17/00* (2006.01)

(52) U.S. Cl.
CPC ............ *F03G 6/089* (2021.08); *F04B 17/006* (2013.01)

(58) Field of Classification Search
CPC ... F03G 6/00; F03G 6/002; F03G 6/02; F03G 6/04; F03G 6/06; F03G 6/089; F03G 7/04; F03G 7/06112; F03G 7/06; F03G 7/06113; F04B 17/006; F24S 50/20
See application file for complete search history.

(56) References Cited

U.S. PATENT DOCUMENTS

| | | | | |
|---|---|---|---|---|
| 3,972,651 A * | 8/1976 | Fletcher | ............ | F03G 6/00 417/209 |
| 4,177,019 A * | 12/1979 | Chadwick | .......... | F03G 6/06 417/394 |
| 4,177,020 A * | 12/1979 | Chadwick | .......... | F03G 6/00 60/531 |
| 4,197,060 A * | 4/1980 | Chadwick | ........... | F04B 43/06 60/541 |
| 4,212,593 A * | 7/1980 | Chadwick | .......... | F04F 1/04 417/209 |
| 4,227,866 A * | 10/1980 | Stubbs | ................. | F02G 1/04 60/641.15 |
| 4,309,148 A * | 1/1982 | O'Hare | ............. | F24S 70/60 417/18 |
| 4,390,325 A * | 6/1983 | Elo | .................... | F04B 43/06 60/531 |
| 4,519,749 A * | 5/1985 | Baumberg | ........... | F04F 9/00 417/108 |
| 2011/0182755 A1* | 7/2011 | Abdullah | ........ | F04B 17/006 417/379 |

FOREIGN PATENT DOCUMENTS

| FR | 2357762 A1 * | 2/1978 | ............ | F03G 6/00 |
|---|---|---|---|---|
| GB | 2015654 A * | 9/1979 | ............ | F03G 6/00 |

(Continued)

*Primary Examiner* — Mark A Laurenzi
*Assistant Examiner* — Xiaoting Hu
(74) *Attorney, Agent, or Firm* — Peter J. Van Bergen

(57) ABSTRACT

A thermal-cycle powered water pump includes a conduit having a first end thereof in a water source. A rigid tank, in fluid communication with the second end of the conduit, is in an environment that experiences a daily thermal cycle. During the daily thermal cycle, heat energy transferred from the environment to the interior increases pressure in the interior, while heat energy transferred from the interior to the environment decreases the pressure in the interior. A first check valve opens a flow path from the conduit's first end to its second end only when the pressure in the tank's interior is less than a water pressure of the source of the water. A second check valve in fluid communication with the tank's outlet opens a flow path from the tank's interior to the environment only when the pressure in the interior is greater than an ambient pressure of the environment.

6 Claims, 4 Drawing Sheets

(56) References Cited

FOREIGN PATENT DOCUMENTS

| | | | | | |
|---|---|---|---|---|---|
| GB | 2211555 | A | * | 7/1989 | ................ F04F 1/02 |
| GB | 2290114 | A | * | 12/1995 | ................ F03G 6/00 |
| GB | 2521805 | A | * | 7/2015 | ............... F04B 19/24 |
| WO | WO-0101759 | A1 | * | 1/2001 | ........... A01G 27/003 |
| WO | WO-03006896 | A1 | * | 1/2003 | ................ F24J 2/345 |

* cited by examiner

THERMAL-CYCLE POWERED WATER PUMP

FIELD OF THE INVENTION

The invention relates generally to water pumps, and more particularly to a water pump that can be powered by a daily thermal cycle of an outdoor environment.

BACKGROUND OF THE INVENTION

Water availability and water distribution are generally not concerns for populations in industrialized parts of the world. However, in many less advanced and/or remote regions of the world, water availability and/or water distribution are monumental concerns for both the regions' governments and the regions' general populations. While such water-challenged regions may have sources of surface or underground water, the resources needed to extract or convey the water (e.g., electric pumps, electricity, etc.) may be too expensive or just not be available.

SUMMARY OF THE INVENTION

Accordingly, it is an object of the present invention to provide a pump for use in conveying or extracting available sources of water.

Another object of the present invention is to provide a water pump that does not require electricity.

Still another object of the present invention is to provide a water pump for use in extracting water from an underground well without the use of electricity.

Other objects and advantages of the present invention will become more obvious hereinafter in the specification and drawings.

In accordance with the present invention, a thermal-cycle powered water pump includes an open-ended conduit having a first end and a second end. The first end is adapted to be disposed in a source of water and the conduit is adapted to be filled with water. The water pump also includes a rigid tank having an inlet and an outlet. The inlet is in fluid communication with the second end of the conduit. The tank is disposed in an environment that experiences a daily thermal cycle. The tank transfers heat energy between the environment and an interior of the tank. Transfer of the heat energy from the environment to the interior increases pressure in the interior, while transfer of the heat energy from the interior to the environment decreases the pressure in the interior. A first check valve is disposed in the conduit for opening a flow path from the conduit's first end to its second end only when the pressure in the tank's interior is less than a water pressure of the source of the water. A second check valve in fluid communication with the outlet opens a flow path from the tank's interior to the environment only when the pressure in the interior is greater an ambient pressure of the environment.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
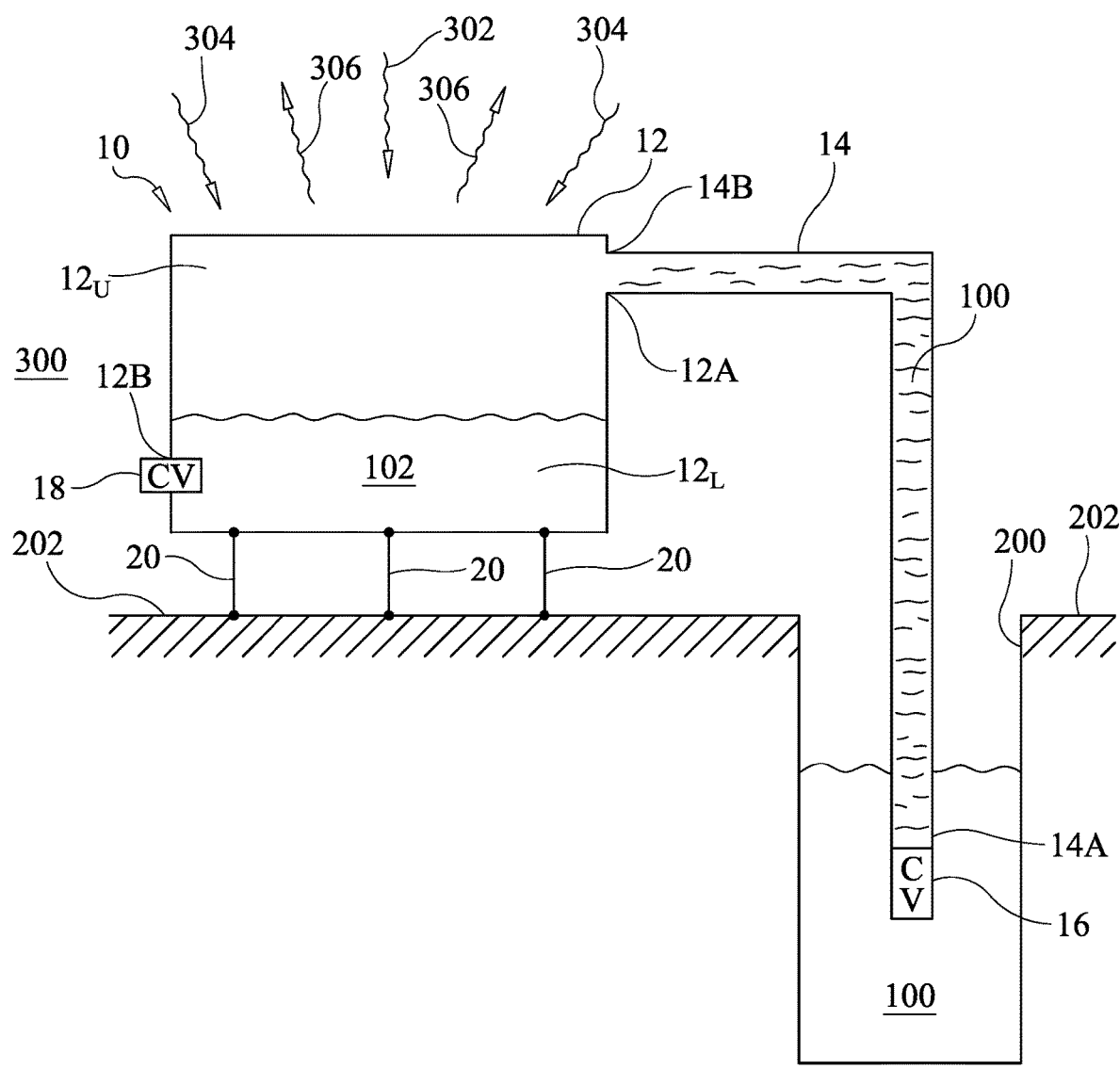
FIG. 1 is a schematic view of a thermal-cycle powered water pump in accordance with an embodiment of the present invention.

Referring now to the drawings and more particularly to FIG. 1, a thermal-cycle powered water pump in accordance with an embodiment of the present invention is shown schematically and is referenced generally by numeral 10. In the illustrated embodiment, water pump 10 will provide for the daily or periodic extraction of water 100 contained within an underground well 200 accessible from above a ground surface 202.

In general, water pump 10 is supported in an outdoor environment 300 at ground surface 202 in proximity to well 200. While in outdoor environment 300, water pump 10 will experience a daily thermal cycle. As used herein, the term "daily thermal cycle" refers to direct solar heating 302 due to the sun's rays during daylight hours, convective heating 304 due to heat in outdoor environment 300, and convective cooling 306 due to cloud cover, night time cooling, and/or general decreases in temperature in outdoor environment 300 relative to the temperature in the tank(s) used in water pump 10 as will be described further below.

Water pump 10 includes at least one tank 12 (e.g., one tank in the illustrated embodiment), at least one open-ended conduit 14 (e.g., one conduit in the illustrated embodiment), and check valves ("CV") 16 and 18. Tank 12 is a rigid tank that can be made of metal, plastic, or combinations thereof such that tank 12 retains its shape as the pump operates throughout its daily thermal cycle. Conduit 14 can be a rigid or flexible conduit without departing from the scope of the present invention. Check valves 16 and 18 can be any conventional check valve design without departing from the scope of the present invention.

As will be explained further below, tank 12 collects water 100 from well 200 and stores it therein as collected water 102 in a lower region 12L of tank 12. However, tank 12 will never be filled with collected water 102 such that an upper region 12u of tank 12 will always be filled with air.

Tank 12 is configured to readily transfer heat energy between outdoor environment 300 and the interior of tank 12. That is, tank 12 is configured to transfer heat energy into its interior due to solar heating 302 and convective heating 304, and to transfer heat energy from the tank's interior to outdoor environment 300 due to convective cooling 306. To facilitate the transfer of heat energy, tank 12 can be made from a variety of specialized materials and/or configurations. However, to achieve cost savings, tank 12 could simply be a readily available tank that is coated, painted, etc., in a dark color, e.g., black, for purposes of heat energy absorption. In some embodiments of the present invention, tank 12 is a cylindrical tank to provide sufficient strength in view of pressure differences that will be experienced within tank 12 during the daily thermal cycle as will be explained further below. In some embodiments of the present invention, tank 12 is an elongated cylindrical tank positioned horizontally above ground surface 202 (e.g., via one or more supports 20) so that the tank's major surface area faces the sky and so that ground surface 202 does not act as a heat sink for the tank.

Tank 12 is in fluid communication with water 100 in well 200 by means of conduit 14. More specifically, one open end 14A of conduit 14 is positioned in water 100 and the other open end 14B is coupled to an inlet 12A of tank 12. Check valve 16 is disposed in conduit 14 (e.g., at open end 14A) and is configured to open only when a water pressure "Pw" in water 100 is greater than an air pressure "$P_T$" in the upper or air region $12_U$ of tank 12 as will be explained further below.

Tank 12 is also in fluid communication with outdoor environment 300. More specifically, an outlet 12B of tank 12 has check valve 18 coupled thereto or in fluid communication therewith (e.g., via a conduit coupled to outlet 12B with check valve 18 disposed therein). Check valve 18 is configured to open only when air pressure $P_T$ in air region $12_U$ of tank 12 is greater than air pressure "$P_E$" in outdoor environment 300 as will be explained further below. Water exiting check valve 18 is then available for use and/or distribution.

When configured as described above, water pump 10 will operate on a daily cycle that pumps water 100 from well 200 into tank 12 where it collects as collected water 102 during part of the cycle, and pumps collected water 102 from tank 12 through check valve 18 during the other part of the cycle. The above pumping cycle is powered by heat energy transfer between outdoor environment 300 and the interior of tank 12 in the following fashion.

Water 100 is pumped from well 200 into tank 12 during convective cooling 306. That is, as outdoor environment 300 cools, heat energy stored within tank 12 (i.e., during solar heating 302 and convective heating 304 as will be explained below) is transferred to outdoor environment 300. When this occurs, the air pressure $P_T$ in tank 12 drops. Once air pressure $P_T$ drops below water pressure $P_W$ in water 100 in well 200 and air pressure $P_E$ of outdoor environment 300, check valve 16 opens and check valve 18 closes thereby allowing water 100 to flow from well 200 (due to the higher water pressure $P_W$) into tank 12 via conduit 14. To facilitate this part of the water pumping cycle, conduit 14 is typically primed by being filled with water 100 as illustrated.

Collected water 102 is pumped from tank 12 to outdoor environment 300 via check valve 18 during solar heating 302 and convective heating 304. That is, as outdoor environment 300 experiences heating, the resultant heat energy is transferred to tank 12 and its interior. When this occurs, air pressure $P_T$ in tank 12 increases with the increasing pressure acting on collected water 102 and water 100 in conduit 14. Once air pressure $P_T$ is greater than water pressure $P_W$ of water 100 and air pressure $P_E$ of outdoor environment 300, check valve 16 closes and check valve 18 opens thereby allowing collected water 102 to flow out of tank 12. The above-described pumping cycle can be further aided by gravity when tank outlet 12B is placed at the bottom of tank 12 and tank inlet 12A is placed near the top of tank 12.

The above-described pumping cycle is based on air pressure changes in tank 12 due to the daily thermal cycle of outdoor environment 300. For best pumping efficiency, the volume of air in upper/air region $12_U$ of tank 12 should be at least three times the volume of collected water 102 at all times during the daily thermal cycle. This air-to-water ratio ensures that the changes in air pressure $P_T$ within tank 12 will be sufficient to achieve the above-described water pumping cycle. In the illustrated embodiment, this air-to-water ratio in tank 12 is achieved through proper sizing of the tank, conduit, and check valves.

Figure 2:
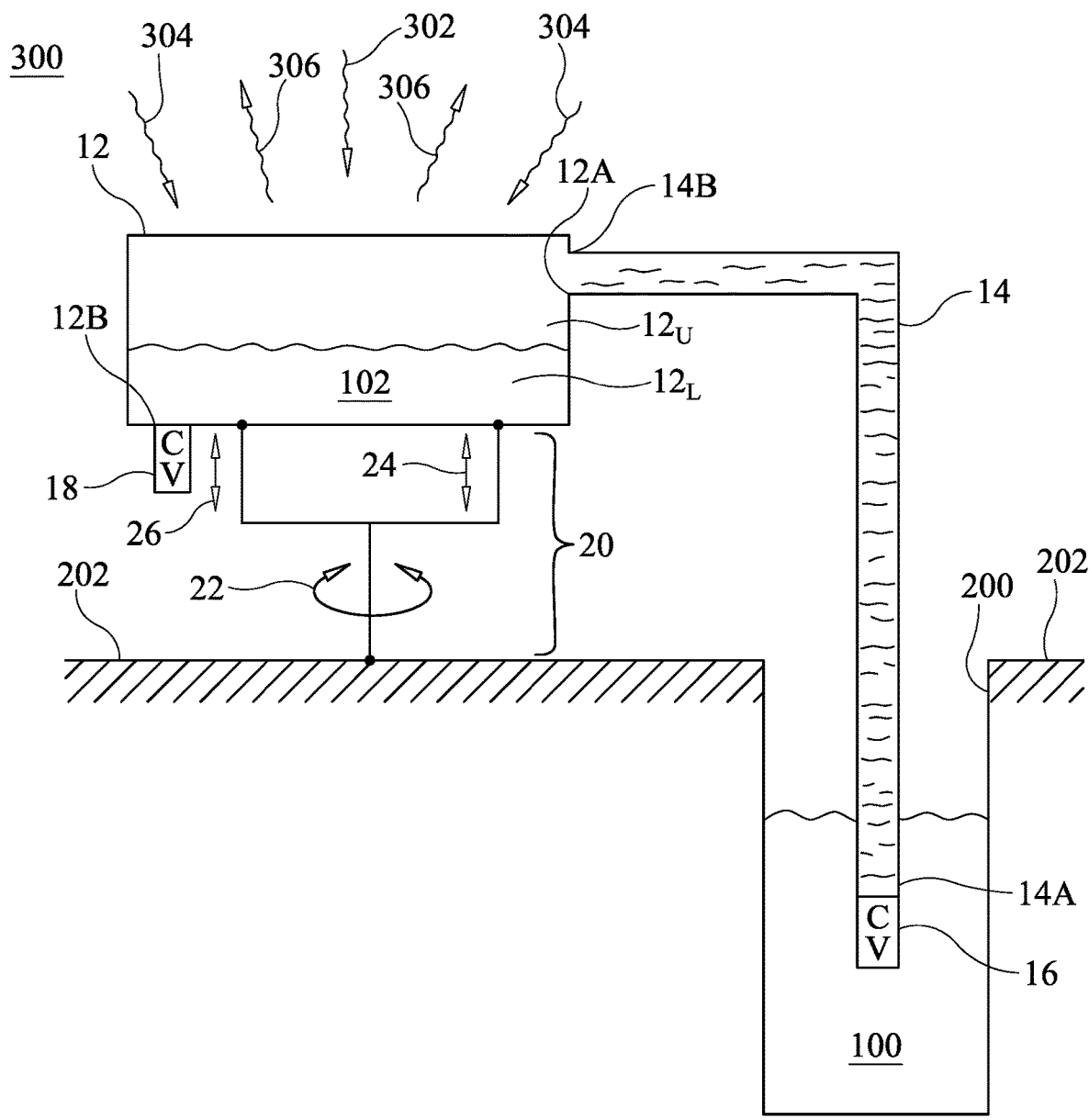
FIG. 2 is a schematic view of a thermal-cycle powered water pump whose tank is mounted on an adjustable support in accordance with another embodiment of the present invention.

In some embodiments of the present invention, the tank can be supported on an adjustable stand or platform as illustrated schematically in FIG. 2. Briefly, in this embodiment, support 20 is an adjustable support positioned on ground surface 202 with tank 12 supported thereby. In general, support 20 is configured to adjust the orientation of tank 12 for maximum heating and/or cooling during the daily thermal cycle. Adjustments can include one or more rotational adjustments as indicated by two-headed arrow 22, and height adjustments of one or both end of tank 12 as indicated by two-headed arrows 24 and 26. In this way, tank 12 can be rotated and angled to track with the sun during daylight hours to maximize heating. At night, tank 12 could be rotated and angled to, for example, face the wind to aid in cooling during the nighttime hours. Support 20 can be a manually-operated support or can include solar-powered control mechanisms to support mechanized and/or automated movements without departing from the scope of the present invention.

Figure 3:
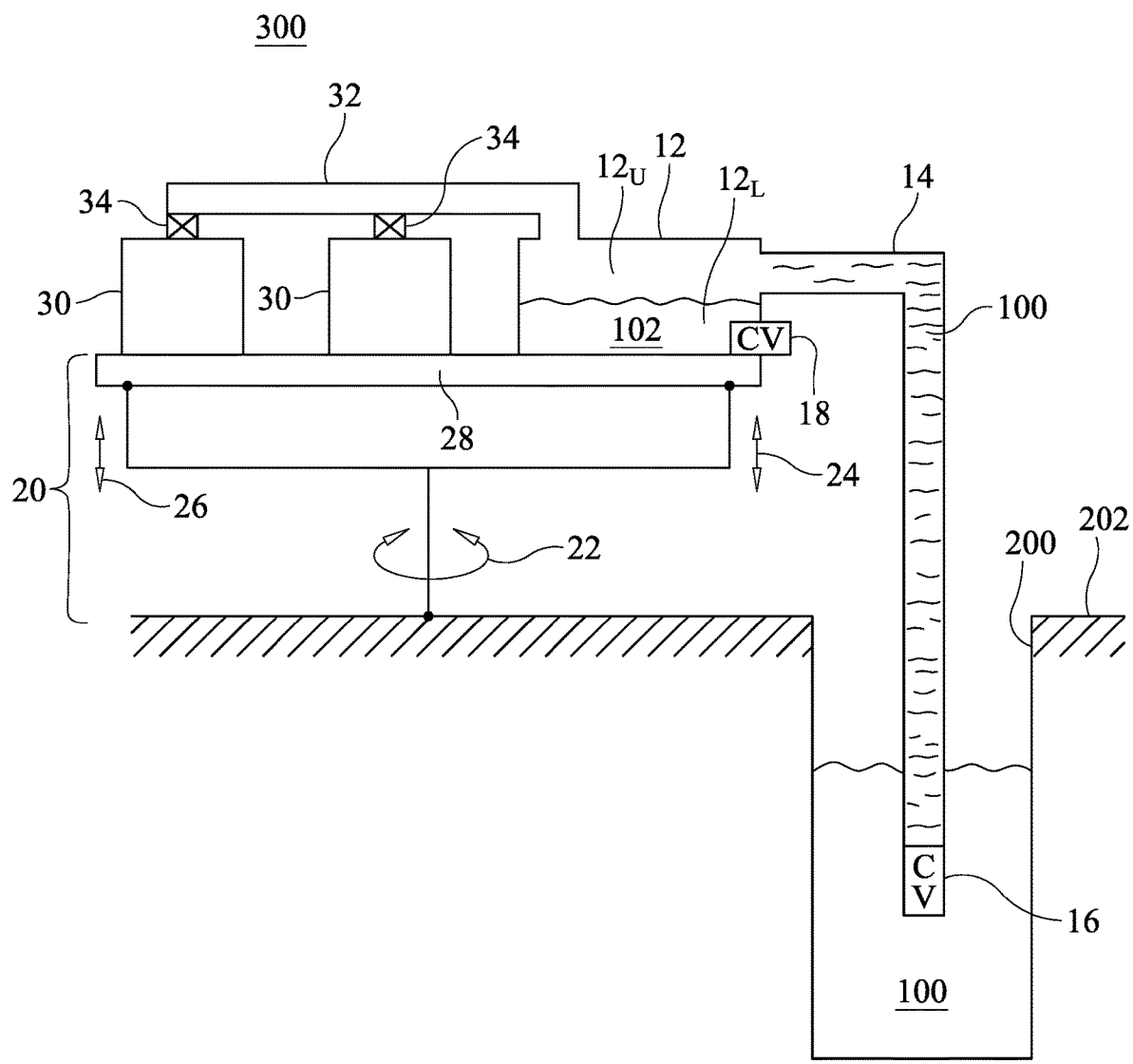
FIG. 3 is a schematic view of a thermal-cycle powered water pump having a water storage tank and multiple air tanks in accordance with another embodiment of the present invention.

In some embodiments of the present invention, it may be desirable to provide one or more additional tanks that allow the air pressure acting on the collected water 102 in tank 12 to be adjusted. For example and as illustrated in FIG. 3, the water pump of the present invention can include air tanks 30 fluidically coupled to tank 12. Although two air tanks 30 are illustrated, it is to be understood that one air tank 30 or more than two air tanks 30 could be used without departing from the scope of the present invention. Each air tank 30 is a rigid tank possessing the same or similar heat transfer attributes of tank 12. In some embodiments of the present invention, tanks 30 can be configured to experience greater pressure changes during the daily thermal cycle than that experienced by tank 12. Each tank 30 is vented to a duct 32 that is in fluid communication with the upper/air region 12u of tank 12 that will contain air throughout the daily thermal cycle. For example, duct 32 can be configured to be in fluid communication with the top portion of tank 12 as illustrated. Valves 34 can be disposed in duct 32 to allow the coupling or decoupling of a tank 30 from the water pump. Tank 12 and tanks 30 can be mounted on a common platform portion 28 of support 20 (e.g., fixed or equipped for adjustability as shown) for coordinated movement thereof to maximize heat energy transfer as described earlier herein. In operation, the air pressure in tanks 30 increases and decreases with the daily thermal cycle as described above for tank 12. The pressure changes in tanks 30 can contribute to the pressure changes used to collect water 102 in tank 12 and to pump it therefrom through check valve 18.

Figure 4:
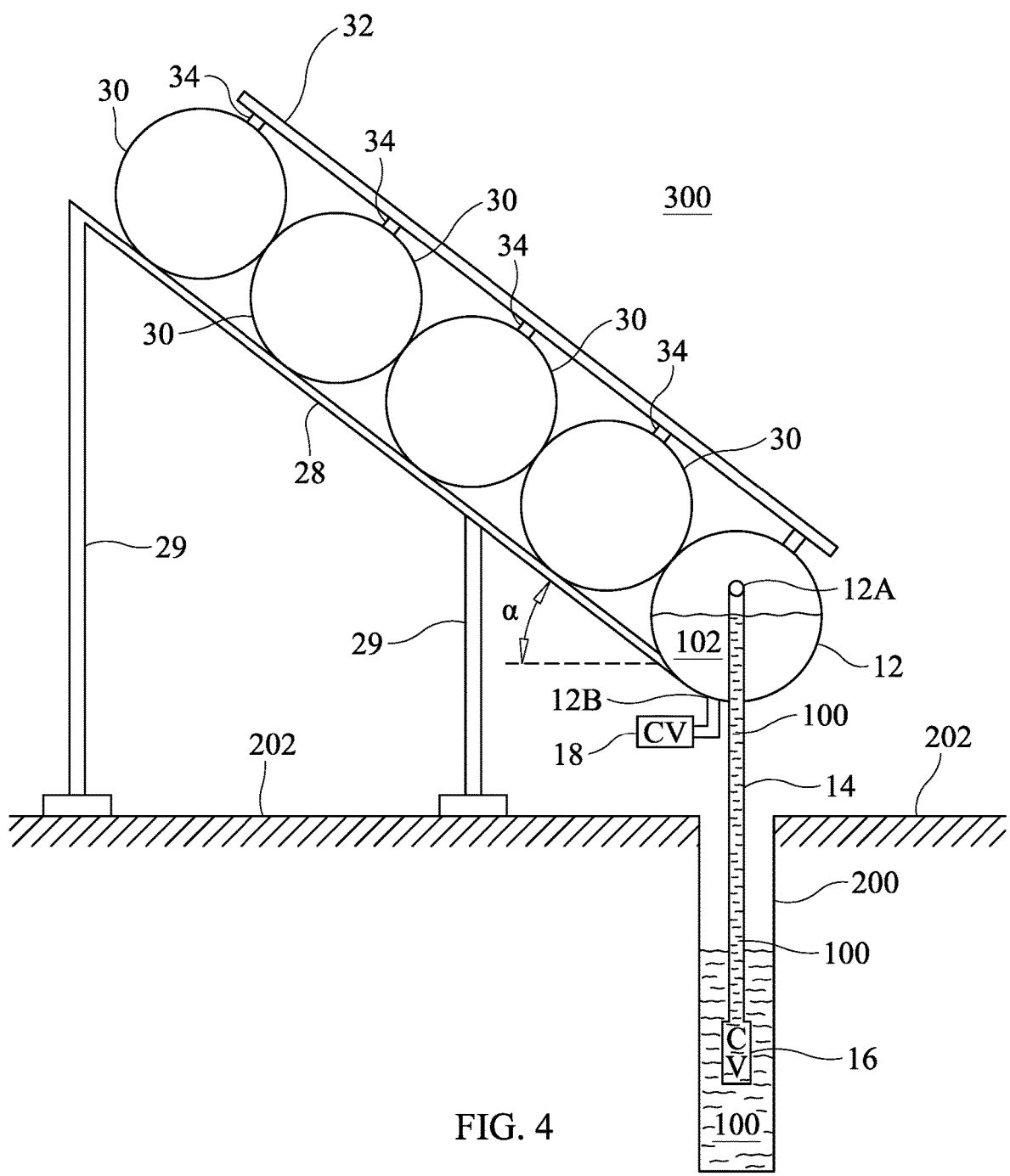
FIG. 4 is a schematic view of a thermal-cycle powered water pump having a water storage tank and multiple air tanks arranged side-by-side on an angled support platform in accordance with another embodiment of the present invention.

In some embodiments of the present invention and as illustrated in FIG. 4, a cylindrical tank 12 and one or more cylindrical tanks 30 can be arranged side-by-side on platform 28 and held at a fixed angle α (e.g., typically in the range of 40°-50°) relative to ground surface 202 by fixed/rigid support legs 29. The angled side-by-side arrangement of tank 12 and tanks 30 can be faced in a westerly direction as an inexpensive approach to maximize heat absorption during daylight heating times. Further, in some embodiments of the present invention, the tanks can be sized and/or separated from one another to minimize the casting of shadows on one another and/or to increase the amount of tank surface area that is exposed to thereby improve the efficiency of heat transfer.

The advantages of the present invention are numerous. The water pump requires no electricity as it relies on the energy provided by an environment's daily thermal cycle. The water pump can be constructed from simple and inexpensive components thereby making it an ideal candidate for use in less developed areas of the world. By including additional air tanks and/or adjustable supports for the tanks, the water pump can be readily oriented for improved efficiency throughout the daily thermal cycle.

Although the invention has been described relative to specific embodiments thereof, there are numerous variations and modifications that will be readily apparent to those skilled in the art in light of the above teachings. For example, the present invention could be deployed adjacent to a source of surface water (e.g., river, lake, etc.) to extract water therefrom as long as the depth of the source was sufficient to provide a pressure head that allowed for water collection during convective cooling portions of the daily thermal cycle. It is therefore to be understood that, within the scope of the appended claims, the invention may be practiced other than as specifically described.

What is claimed as new and desired to be secured by Letters Patent of the United States is:

1. A thermal-cycle powered water pump, comprising:
   an open-ended conduit having a first end and a second end, said first end adapted to be disposed in a source of water and said conduit adapted to be filled with water;
   a rigid water storage tank having an inlet and an outlet, said inlet in fluid communication with said second end of said conduit, said water storage tank adapted to be disposed in an environment that experiences a daily thermal cycle, said water storage tank adapted to transfer heat energy between the environment and an interior of said water storage tank, wherein said interior of said water storage tank includes a first region of collected water and a second region of air, wherein transfer of the heat energy from the environment to said interior increases air pressure of said second region, and wherein transfer of the heat energy from said interior to the environment decreases said air pressure of said second region, and wherein the environment is an outdoor environment and the source of the water is underground;
   at least one rigid air tank adapted to be disposed in the environment and in fluid communication with said second region of said water storage tank, each said air tank adapted to transfer heat energy between the environment and an interior of said air tank, wherein transfer of the heat energy from the environment to said interior of said air tank increases air pressure in said interior of said air tank, and wherein transfer of the heat energy from said interior of said air tank to the environment decreases said air pressure in said interior of said air tank;
   a first check valve disposed in said conduit for opening a flow path from said first end to said second end only when said air pressure of said second region is less than a water pressure of the source of the water;
   a second check valve in fluid communication with said outlet for opening a flow path from said first region of said water storage tank to the environment only when said air pressure of said second region of said water storage tank is greater than an ambient pressure of the environment; and
   a tank support adapted to be positioned at a ground surface of the outdoor environment for positioning said water storage tank and each said air tank above the ground surface throughout the daily thermal cycle, wherein said tank support positions said water storage tank and each said air tank in a side-by-side arrangement and at an angle with respect to the ground surface, wherein said angle is between 40° and 50°.

2. The thermal-cycle powered water pump as in claim 1, wherein said outlet of said water storage tank is below said inlet of said water storage tank.

3. The thermal-cycle powered water pump as in claim 1, wherein said first check valve is positioned at said first end of said conduit.

4. The thermal-cycle powered water pump as in claim 1, wherein said tank support is adjustable for changing positions of said water storage tank and each said air tank above the ground surface throughout the daily thermal cycle.

5. The thermal-cycle powered water pump as in claim 1, wherein said water storage tank and each said air tank are black in color.

6. The thermal-cycle powered water pump as in claim 1 wherein, during the daily thermal cycle, the water flows from the source into said first region of said water storage tank via said inlet and flows out of said first region of said water storage tank via said outlet, and wherein a total volume of air contained within a combination of said second region of said water storage tank and each said air tank is at least three times a volume of the water in said first region of said water storage tank during the daily thermal cycle.

* * * * *